(12) United States Patent  (10) Patent No.: US 7,918,089 B1
Wierzchon  (45) Date of Patent: Apr. 5, 2011

(54) MODULAR MASTER CYLINDER BODY

(75) Inventor: Peter Wierzchon, Morton Grove, IL (US)

(73) Assignee: Robert Bosch GmbH, Stuttgart (DE)

( * ) Notice: Subject to any disclaimer, the term of this patent is extended or adjusted under 35 U.S.C. 154(b) by 326 days.

(21) Appl. No.: 12/050,246

(22) Filed: Mar. 18, 2008

(51) Int. Cl.
    *F15B 7/08* (2006.01)
(52) U.S. Cl. .......................................... 60/585
(58) Field of Classification Search .............. 60/585, 60/588
    See application file for complete search history.

(56) References Cited

U.S. PATENT DOCUMENTS

| | | | |
|---|---|---|---|
| 2,561,009 A * | 7/1951 | Byers et al. | 60/588 |
| 4,122,596 A | 10/1978 | Fields | |
| 4,320,624 A | 3/1982 | Takeuchi | |
| 5,513,492 A | 5/1996 | Anderson | |
| 5,590,527 A | 1/1997 | Shaw | |
| 6,658,844 B1 | 12/2003 | Lammers | |
| 7,299,631 B2 * | 11/2007 | Bourlon et al. | 60/585 |

FOREIGN PATENT DOCUMENTS

| | | |
|---|---|---|
| DE | 3940498 | 6/1991 |
| EP | 0270285 | 6/1988 |
| FR | 2848962 | 6/2004 |
| WO | 9419618 | 9/1994 |

OTHER PUBLICATIONS

International Searching Authority, Invitation to Pay Additional Fees and, Where Applicable, Protest Fee, PCT Application No. PCT/US2009/036820, Feb. 25, 2010 (5 pages).

* cited by examiner

*Primary Examiner* — Michael Leslie
(74) *Attorney, Agent, or Firm* — Maginot, Moore & Beck

(57) ABSTRACT

A master cylinder has a body formed from a seamless cylindrical tube. Bosses are welded to an exterior sidewall portion of the tube and have passages communicating with the interior bore. An end cap closes one bore end and includes a passageway for supplying pressurized hydraulic fluid from the bore to individual wheel brake cylinders. The mating reservoir includes a pair of downwardly depending legs for attachment. A pair of bolts extend from a vacuum booster, pass through the reservoir mounting bolt apertures and engage the end cap of the body securing the resulting assembly to the vehicle.

10 Claims, 5 Drawing Sheets

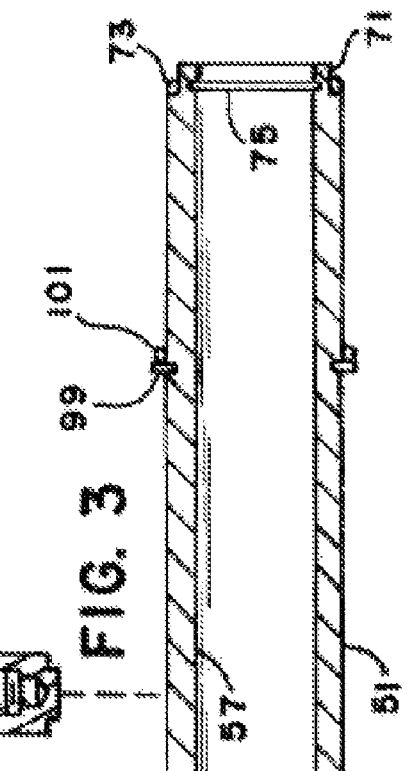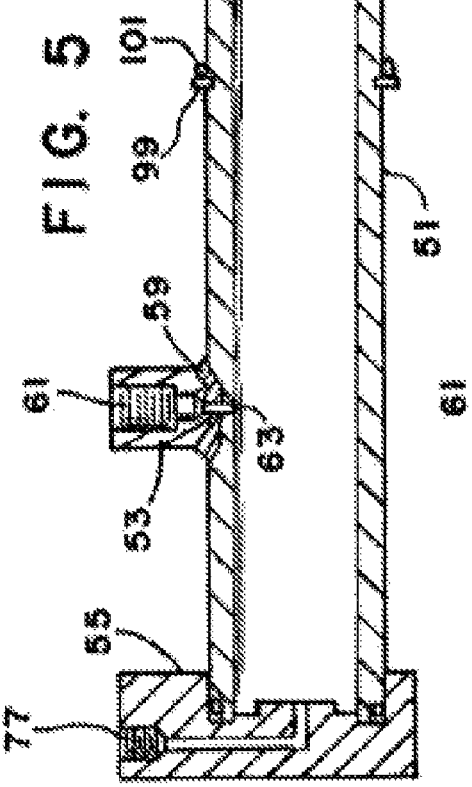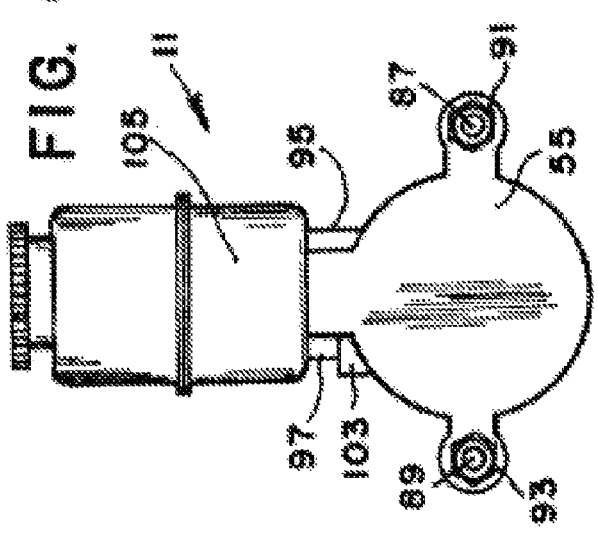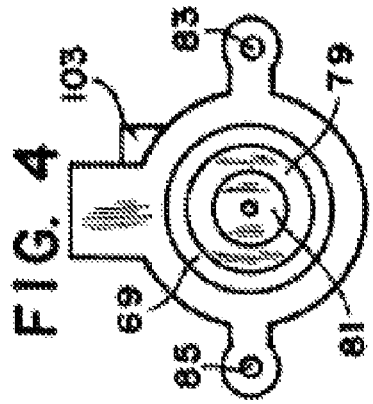

MODULAR MASTER CYLINDER BODY

BACKGROUND OF THE INVENTION

1. Field of the Invention

The present invention relates to hydraulic braking systems and more particularly to an improved vehicle hydraulic brake master cylinder.

2. Description of the Related Art

Vehicle hydraulic braking systems and the master cylinder designs utilized therein are old and well known. In its simplest form, the master cylinder has a fluid reservoir located above a hydraulic chamber which is closed at one end by a spring biased movable piston and opens at the other end into one or more individual brake lines. The master cylinder functions, upon mechanical actuation (often vacuum boosted) of the movable piston to supply brake applying fluid pressure to one or more vehicle wheel braking cylinders. Relatively simple master cylinders of this type are shown, for example, in U.S. Pat. Nos. 4,320,624 and 6,658,844. It is not uncommon to split vehicle hydraulic circuits into two or more nearly autonomous circuits, for example, one circuit might actuate the front wheel brakes while another operates the rear wheel brakes. One way to effect such a split is to employ a single master cylinder having separate, but simultaneously actuable hydraulic chambers. Separate fluid reservoirs or a single shared reservoir may be employed. Master cylinders having two separate chambers are illustrated in U.S. Pat. Nos. 4,122,596 and 5,513,492 among others. This latter patent illustrates a tandem master cylinder having a cylinder body containing primary and secondary pistons. The primary piston has an integrally formed force input rod through which it is actuated from a driver's pedal or a booster device. The secondary piston is coupled to the primary piston for simultaneous operation by way of springs acting between the pistons with the combined strength of the springs being more than a secondary piston return spring acting between the secondary piston and the blind end of the cylinder body. The secondary piston carries a forward seal which, together with the internal cylinder wall, defines a pressure chamber. A further pressure chamber is defined between the pistons by a seal carried by the primary piston and a further seal carried at the rear end of the secondary piston. The cylinder body provides a pair of reservoir connections which communicate respectively with separate fluid chambers of a fluid reservoir.

The aforementioned U.S. Pat. No. 4,122,596 observes that due to the high pressures involved and limited space, master brake cylinders have been conventionally formed as relatively thick-walled but simple castings by utilizing either sand or metal cores. Whichever method of coring is employed, the critical rubbing surfaces of the master brake cylinder must be machined to eliminate scratches resulting from stripping of coring and to define a better surface against which the piston may bear. Finally, the patentee observes the cost of machining is one of the undesirable aspects of conventionally made brake cylinders. To reduce weight and avoid machining of brake cylinders, the patented arrangement employs an integral composite casting about a seamless steel tube of critical thickness, closed at one end, and treated by acid etching on its exterior. The tube is pretreated to contain critically dimensioned punched and coined openings for brake fluid filling and fluid delivery. The tube is preheated to a predetermined temperature and molten magnesium is cast thereabout producing a compression fit about the tube as a result of solidification shrinkage. Thus, in addition to the traditional casting and bore honing, the prior patented master cylinder forming techniques range from the simple master cylinder and reservoir formed of a single molded plastic piece a shown by U.S. Pat. No. 6,658,444 to this rather complex molding about a cylindrical insert.

Applicant's Assignee currently manufactures a heavy duty (large bore) master cylinder in which such conventionally formed relatively thick-walled but simple castings utilizing either sand or metal cores have not been satisfactory. In order to maintain structural and metallurgical integrity, these master cylinder body castings cannot core the internal bore. The bore is formed by machining the previously cast body. Significant stock removal is therefore required to create the main bore. This process is wasteful both in the casting and increased machining cycle time. Finish wall thickness and fixturing variations further increase the casting OD to insure structural integrity. The increasing cost of aluminum alloy has made manufacture of the big bore master cylinder designs significantly more expensive. An economic analysis of this product has revealed the master cylinder casting to be far the most costly feature of the master cylinder.

It is highly desirable to move away from a massive body casting for large bore master cylinders. This will increase design flexibility as well as minimizing piece part cost and tooling investment.

SUMMARY OF THE INVENTION

The present invention allows the selection of components for the body that are optimized to perform their function and eliminates features that are driven by a single manufacturing process, e.g., a casting.

The invention comprises, in one form thereof, a vehicle hydraulic master brake cylinder assembly including a body having a generally smooth cylindrical interior bore for receiving one or more master cylinder pistons and other conventional components. A hydraulic fluid reservoir for selectively supplying hydraulic fluid to the bore has a pair of downwardly depending legs which straddle the master cylinder body and terminate in respective mounting bolt apertures. A pair of cantilevered bolts extend from a vacuum booster, pass through the reservoir mounting bolt apertures and engage the body. The body is formed from an elongated seamless cylindrical tube and a cast end cap. There are two external bosses welded to exterior sidewall portions of the tube, each having a transverse passageway communicating with the interior bore, one for selectively supplying fluid from reservoir to the bore, and the other for selectively supplying pressurized hydraulic fluid from the bore to individual wheel brake cylinders. The end cap may have formed therein additional passageways adapting the assembly to a split system.

An advantage of the present invention is that a massive casting and much of the subsequent machining are eliminated.

Another advantage is a simple, low initial investment and highly adaptable approach to the manufacture of large size, low production volume master cylinders.

BRIEF DESCRIPTION OF THE DRAWINGS

FIG. 3 is an exploded cross-sectional view of a large bore master cylinder body according to the present invention;

FIG. 4 is an end elevation view of the end cap of FIG. 3 from the right side thereof;

FIG. 5 is a cross-sectional view of the assembled large bore master cylinder of FIG. 3;

FIG. 6 is an end elevation view of the reservoir and master cylinder assembly.

Corresponding reference characters indicate corresponding parts throughout the several drawing views.

DETAILED DESCRIPTION OF THE INVENTION

Figure 1:
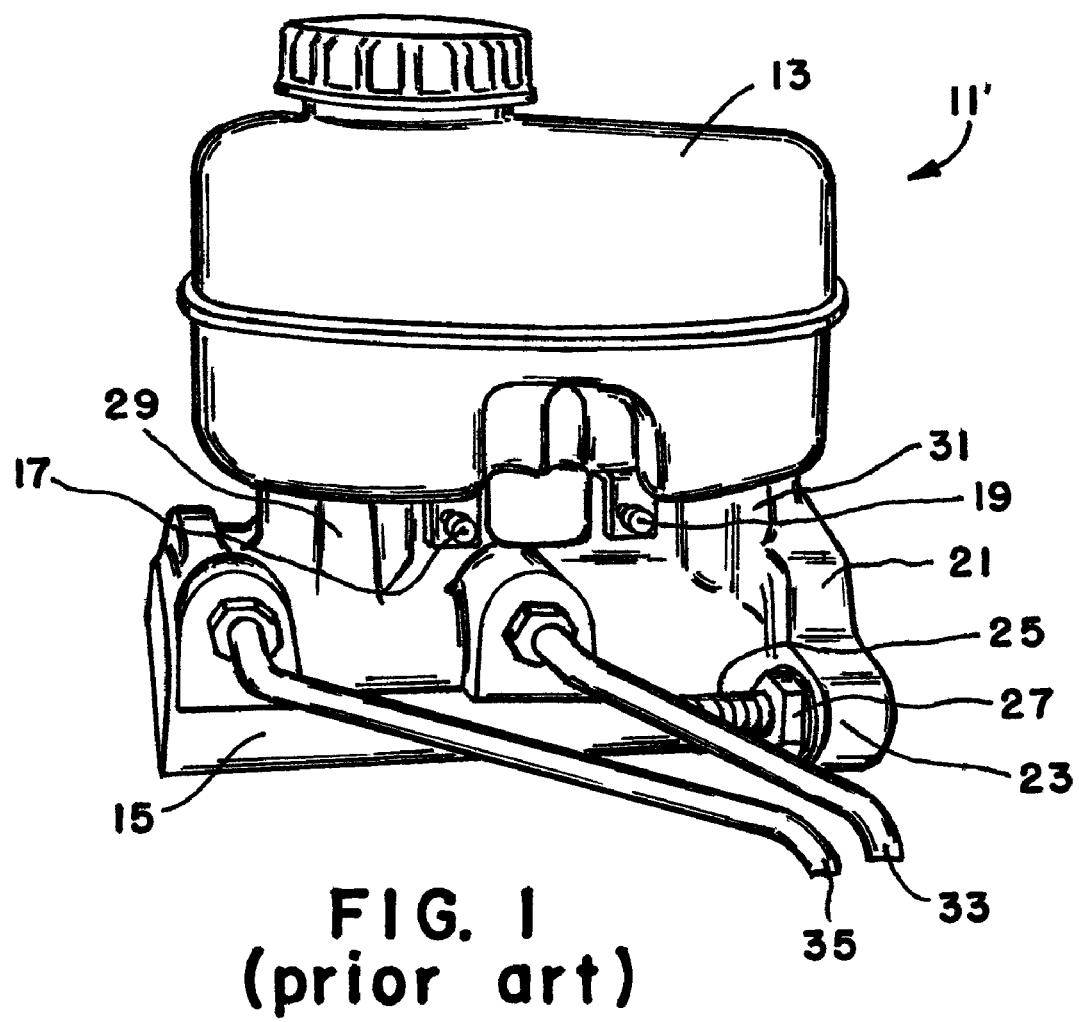
FIG. 1 is an isometric view of a large bore master cylinder assembly currently manufactured by Applicant's Assignee.
Figure 2:
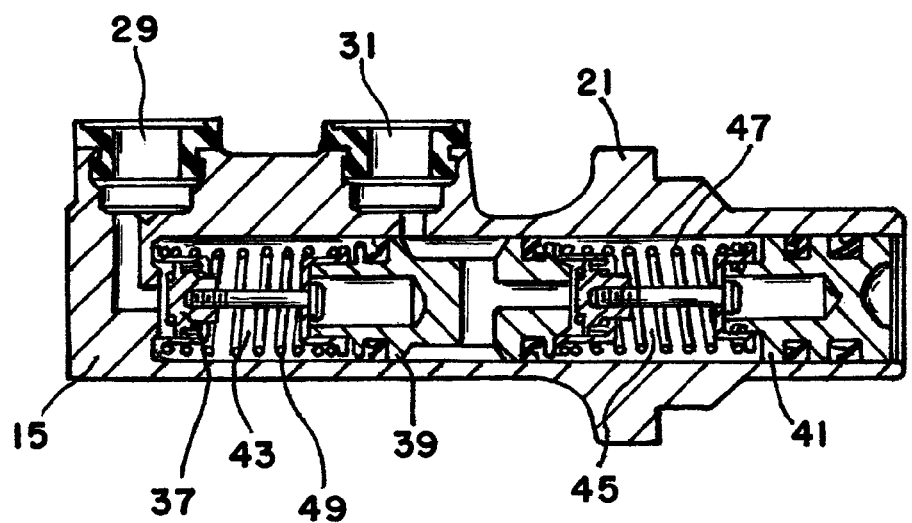
FIG. 2 is a cross-sectional view of the master cylinder portion of FIG. 1.

Referring now to the drawings and particularly to FIGS. 1 and 2, there is shown a split system hydraulic brake master cylinder assembly 11 according to the prior art. A fluid reservoir 13 is mechanically fixed to a master cylinder body casting 15 by fasteners 17 and 19. The casting includes a mounting flange 21 having a pair of laterally extending apertured ears 23. A pair of threaded studs such as 25 extend from the face of a vacuum booster and the master cylinder assembly 11 is fixed to these studs by nuts such as 27. The vacuum booster is fixed to the vehicle and supports the master cylinder body. The vacuum booster augments operator applied brake pedal force to said master cylinder piston. The reservoir is hydraulically coupled to the master cylinder by a pair of vertically extending ports or reservoir interfaces 29 and 31. The assembly selectively supplies pressure fluid to actuate vehicle brakes by way of hydraulic lines 33 and 35.

Referring more particularly to FIG. 2, the master cylinder body encloses a poppet valve 37, and a pair of pistons 39 and 41 defining pressure chambers 43 and 45. Spring 47 resiliently couples the pistons and a secondary piston return spring 49 biases the piston assembly toward the right as viewed. Hydraulic fluid is supplied to the master cylinder as needed by way of primary 31 and secondary 29 reservoir interfaces.

Figure 7:
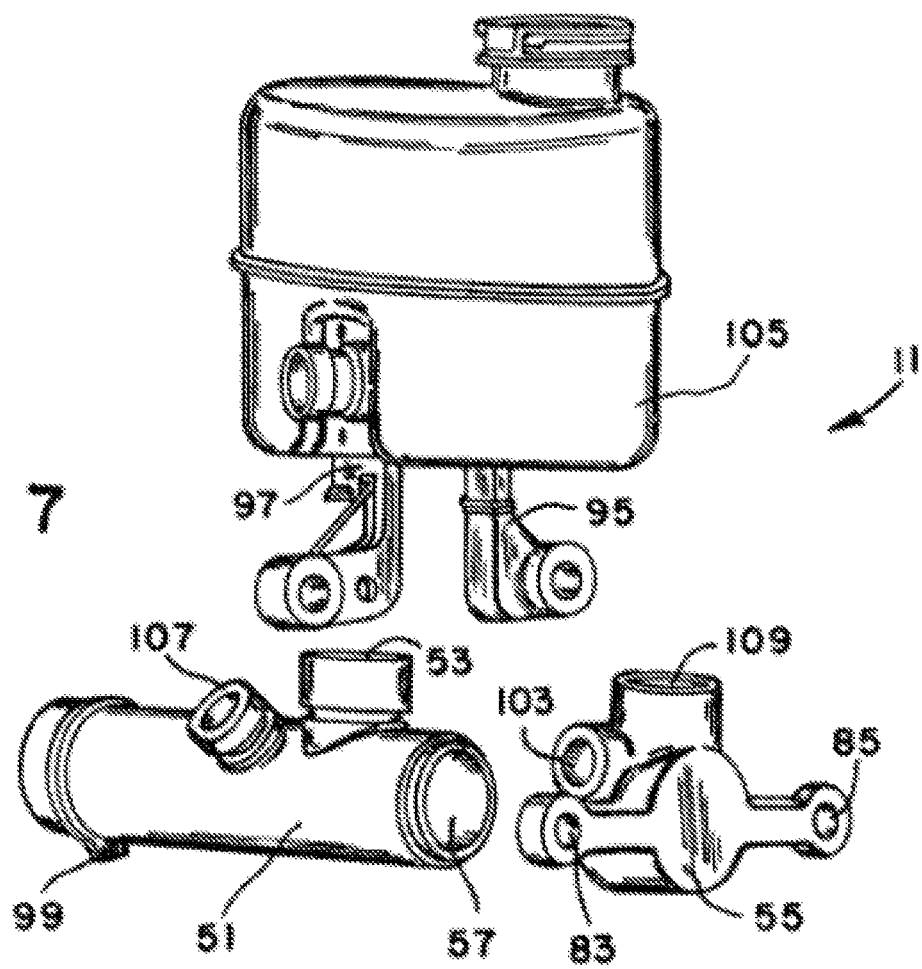
FIG. 7 is an exploded isometric view of a master cylinder and reservoir assembly of FIG. 6.

In the present invention, the costly master cylinder body 15 of FIGS. 1 and 2 is replaced by an elongated seamless cylindrical tube 51 having an external boss 53 welded to an exterior sidewall portion and an end cap 55 for closing one end of the generally smooth cylindrical interior bore 57 as depicted in FIGS. 3-5. The bore is sized to receive conventional internal components such as those shown in FIG. 2. Fabrication begins by cutting the tube to a preferred length and forming one end with a seal 65 receiving groove 67 which will sealingly mate with groove 69 in the end cap 55. The opposite tube end may be similarly formed with a step 71 and seal 73 which will form a booster vacuum seal interface. An external groove for receiving snap ring 99 and seal 101 provides a positive stop against the booster which was formerly provided by the flange 21 of FIGS. 1 and 2. An internal snap ring groove 75 may be included for receiving a snap ring to retain the pistons against the urging of internal springs such as 47 and 49 of FIGS. 1 and 2. Next, the boss 53 is welded to the tube 51 sidewall as illustrated at 59 and thereafter the transverse passageway 61 is extended by boring hole 63 through the tube sidewall and into communication with the interior bore. One or more bosses each having a fluid passageway therethrough may be welded to exterior sidewall portions of the tube and the tube sidewall portions transversely boring to extend the respective passageways into the tube interior as illustrated in FIG. 7. The bosses may be externally or internally threaded, or otherwise suitably formed to effect connections similar to those shown in FIG. 1.

The steel tube 51 forms the main bore 57 of the master cylinder. Preferably this tube is in the form of a drawn over mandrel seamless steel tube that is cut to length. Material of this type can be purchased with a honed bore. Steel grades of 1020 to 1026 are typical for this type of application. The steel tube has better mechanical properties than aluminum and the wall thickness can be reduced to 0.095 inches to 0.125 inches and easily handle the pressure and structural loads. The uniform external diameter can be used to provide a high quality seal surface for the booster/master cylinder vacuum interface. Minimal OD machining is required to create the end geometry that forms the seal geometry between the tube 51 and end cap 55. Simple grooving tools can be used to provide a positive stop to locate the master cylinder tube relative to the booster flange.

The primary outlet port 107 and primary reservoir interface 53 can be created by using existing "weld studs". This existing technology from suppliers such as Image Industries located in Wood Dale, Ill. employs a drawn arc or capacitor discharge welding technique which can be used to attach a full cross-sectional welded port with a short cycle time and minimal tube distortion. Due to a short weld time and a small heat affected zone, bore honing is typically not required after this operation. The only machining required after welding is drilling of the communication channel such as 63. This would have to be done anyway and by performing the operation after welding, perfect alignment of the port and tube is maintained. By using weld ports, various port interfaces can be easily incorporated into the design allowing low volume applications to be produced cost effectively.

The end cap 55 is cast, machined to define the generally annular groove 69 for receiving one tube end and hydraulic seal 67, and a passageway 77 providing the function of the secondary reservoir interface 29 of FIG. 2. A further passageway for selectively supplying pressurized hydraulic fluid from the bore to individual wheel brake cylinders may also be provided as at 103 in FIG. 7. End cap 55 has a further groove 79 for seating one end of a return spring 49 and interface 81 for poppet valve 37, both of FIG. 1. Master cylinder of FIG. 5 is then completed by fitting a movable piston in the tube bore, such as depicted in the FIG. 2, defining between the piston and end cap 55 one or more hydraulic chambers.

Figure 8:
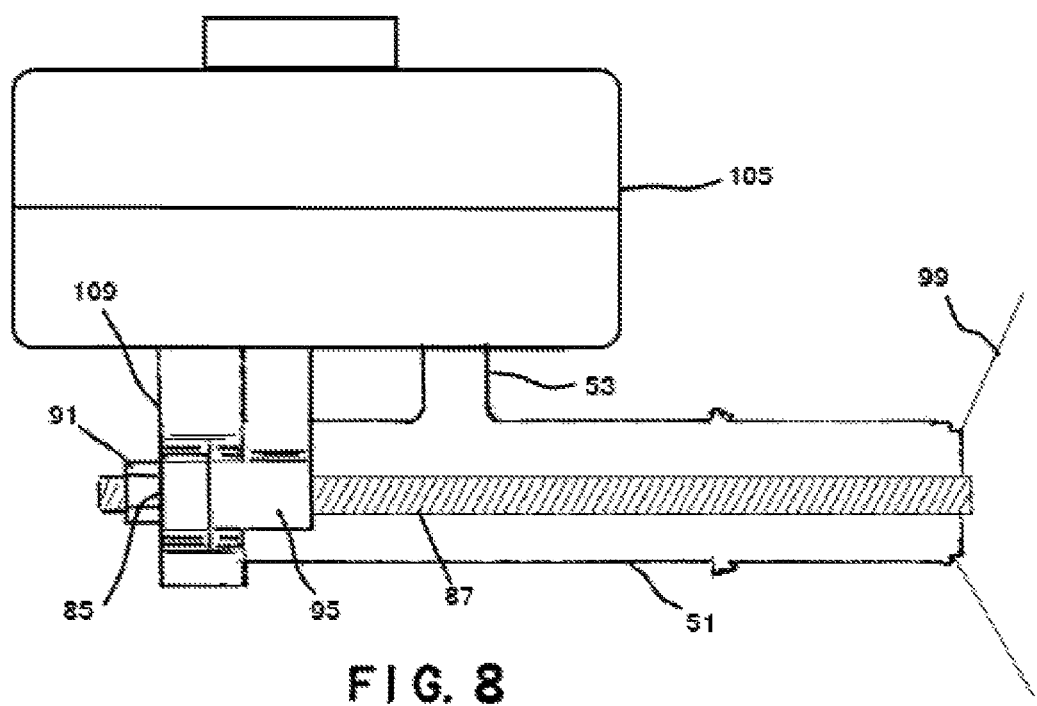
FIG. 8 is a side elevational view of the master cylinder and reservoir assembly of FIGS. 6 and 7 shown connected to a vacuum booster.

In addition to supplanting the functions of the left hand portion of the master cylinder body 15 of FIG. 2, the end cap 55 has a pair of apertures 83 and 85 (FIG. 4) which eliminate the need for the apertured ears 23 of FIG. 1. These apertures receive through studs or screws 87 and 89 similar to, but longer than the threaded studs 25 of FIG. 1, and nuts 91 and 93 which clamp the end cap and booster together with the tube and seal captured therebetween as depicted in FIG. 8. As shown in FIGS. 7 and 8, the studs also pass through reservoir 105 legs 95 and 97 providing the function of the fasteners 17 and 19 of FIG. 1.

The end cap 55 can be an optimized aluminum casting incorporating the poppet seat 81, spring seat 79, secondary outlet port 103, secondary reservoir interface 109 and the sealing interface 69 for the steel tube. It may also contain the flanged ears with apertures 83 and 85 to allow the assembly to be bolted together.

This piece incorporates all of the features into a single, high value component which forms the end of the pressure vessel. The compact size and simplicity may allow use of a simple sand casting in place of the current permanent mold casting.

As seen in FIGS. 6-8, the master brake cylinder assembly reservoir 105 includes a pair of downwardly depending legs 95 and 97 which straddle the master cylinder body 51 when the reservoir is mated with the external bosses 53 and 109.

These legs 95 and 97 terminate in respective mounting bolt apertures which are aligned with the apertures 83 and 85. A pair of cantilevered studs or bolts 87 and 89 similar to, but longer than bolts such as 25 in FIG. 1 extend from the vacuum booster 99, pass through the reservoir 105 mounting bolt apertures and engaging the end cap 55 apertures 83 and 85. Threaded nuts 91 and 93 retain the modular master cylinder body to the booster and the tube 51 and end cap 55 are held in compression by the studs. The wide spacing between legs 95 and 97 offers improved lateral stability over current reservoir designs, compare FIGS. 1 and 7.

Thus, while a preferred embodiment has been disclosed, numerous modifications will occur to those of ordinary skill in this art. Accordingly, the scope of the present invention is to be measured by the scope of the claims which follow.

What is claimed is:

1. A vehicle hydraulic master brake cylinder assembly comprising:
   a master cylinder body including an elongated seamless cylindrical tube having a generally smooth cylindrical interior bore for receiving at least one master cylinder piston;
   an external boss welded to an exterior sidewall portion of the tube having a transverse passageway communicating with the interior bore;
   an end cap for closing one bore end having a generally annular groove for receiving one tube end, the end cap including a first passageway for selectively supplying pressurized hydraulic fluid from the bore to individual wheel brake cylinders and a second passageway for receiving hydraulic fluid from a hydraulic fluid reservoir; and
   an annular seal intermediate the groove and one tube end for providing a hydraulic seal therebetween.

2. The master brake cylinder assembly of claim 1, further including a hydraulic fluid reservoir adapted to sealingly mate with the external boss.

3. The master brake cylinder assembly of claim 2, wherein the reservoir includes a pair of downwardly depending legs straddling the master cylinder body when the reservoir is mated with the external boss, and terminating in respective mounting bolt apertures.

4. The master brake cylinder assembly of claim 3, further comprising a vacuum booster fixed to the vehicle and supporting the master cylinder body, for augmenting operator applied brake pedal force to said master cylinder piston.

5. The master brake cylinder assembly of claim 4, further including a pair of cantilevered bolts extending from the booster, passing through the reservoir mounting bolt apertures and engaging the end cap for clamping the end cap and booster together with the reservoir legs, tube and seal captured therebetween.

6. The master brake cylinder assembly of claim 1, further including a second external boss welded to an exterior sidewall portion of the tube having a transverse passageway communicating with the interior bore for selectively supplying pressurized hydraulic fluid from the bore to additional wheel brake cylinders distinct from said individual wheel brake cylinders.

7. A vehicle hydraulic master brake cylinder assembly, comprising:
   a master cylinder body having a generally smooth cylindrical interior bore for receiving at least one master cylinder piston;
   a hydraulic fluid reservoir adapted to selectively supply hydraulic fluid to the interior bore;
   the reservoir including a pair of downwardly depending legs straddling the master cylinder body and terminating in respective mounting bolt apertures;
   a vacuum booster fixed to the vehicle and supporting the master cylinder body, for augmenting operator applied brake pedal force to said master cylinder piston; and
   a pair of cantilevered bolts extending from the booster, passing through the reservoir mounting bolt apertures and engaging the body.

8. The master brake cylinder assembly of claim 7, wherein the body includes an elongated seamless cylindrical tube with at least one external boss welded to an exterior sidewall portion of the tube having a transverse passageway communicating with the interior bore for conveying pressurized fluid between the bore and another brake component.

9. The master brake cylinder assembly of claim 8, wherein there are two external bosses welded to exterior sidewall portions of the tube, each having a transverse passageway communicating with the interior bore, one for selectively supplying fluid from reservoir to the bore, and the other for selectively supplying pressurized hydraulic fluid from the bore to individual wheel brake cylinders.

10. A process of fabricating a master brake cylinder, comprising:
   providing an elongated seamless cylindrical tube having a hollow bore;
   cutting the tube to a preferred length;
   forming one tube end to sealingly mate with an end cap;
   forming first and second bosses each having a fluid passageway therethrough;
   welding the first and second bosses to exterior sidewall portions of the tube;
   transversely boring the tube sidewall portions to extend the respective passageways into the tube interior;
   sealingly joining the one tube end and end cap, the end cap including a first passageway for selectively supplying pressurized hydraulic fluid from the bore to individual wheel brake cylinders and a second passageway for receiving hydraulic fluid from a hydraulic fluid reservoir;
   fitting a movable piston in the tube bore defining between the piston and end cap at least one hydraulic chamber; and
   effecting hydraulic connections to the bosses.

* * * * *